United States Patent [19]

Kuwahata et al.

[11] Patent Number: 4,471,084

[45] Date of Patent: Sep. 11, 1984

[54] DIAPHRAGM FOR LOUDSPEAKERS

[75] Inventors: Toshikatsu Kuwahata, Tokyo; Nobuo Fuke, Komae; Toshihiro Fukuhara, Yamato; Yoshiaki Suzuki, Ebina, all of Japan

[73] Assignee: Victor Company of Japan, Limited, Yokohama, Japan

[21] Appl. No.: 452,317

[22] Filed: Dec. 22, 1982

[30] Foreign Application Priority Data

Dec. 25, 1981 [JP] Japan ................................ 56-212256

[51] Int. Cl.$^3$ ........................ C08K 3/10; C08K 3/22; C08L 23/12

[52] U.S. Cl. .................................... 524/413; 524/401; 524/434; 524/497; 524/579; 524/584

[58] Field of Search ............... 524/401, 579, 497, 584, 524/434, 413

[56] References Cited

U.S. PATENT DOCUMENTS

| | | | |
|---|---|---|---|
| 3,895,157 | 7/1975 | Brixner et al. | 428/469 |
| 4,111,866 | 9/1978 | Torikai et al. | 521/145 |
| 4,190,746 | 2/1980 | Harwood et al. | 179/115.5 R |

FOREIGN PATENT DOCUMENTS

| | | |
|---|---|---|
| 53-45226 | 4/1978 | Japan . |
| 55-46112 | 11/1980 | Japan . |

OTHER PUBLICATIONS

Derwent Abstract 28113 A/15 (3-1978) J53023871 Nippon Asbestos.

Derwent Abstract 49204 E/24 (5-1982) J57074342 Bridgestone.

Derwent Abstract 43134 A/24 (5-1978) J53050249 Hitachi.

Derwent Abstract 13490 C/08 (1-1980) J55003240 Toa Tokushu.

Derwent Abstract 49992 B/27 (5-1979) J54066119 Matsushita.

Derwent Abstract 85894 D/47 (10-81) J56127643 Showa.

Derwent Abstract 34064 B/18 (3-1979) J54037719 Mitsubishi.

Derwent Abstract 03149 K/02 (11-1982) J57192441 Otsuka.

*Primary Examiner*—Herbert J. Lilling

*Attorney, Agent, or Firm*—Lowe, King, Price & Becker

[57] ABSTRACT

A diaphragm for a loudspeaker is described, which essentially consists of a polyolefin resin such as propylene homopolymer or copolymer with an ethylenically unsaturated copolymerizable monomer or a 4-methylheptene-1 resin and short fibers of potassium titanate. The titanate fibers have an average fiber length of 10 to 30 microns and an average diameter of 0.1 to 0.5 micron.

4 Claims, 1 Drawing Figure

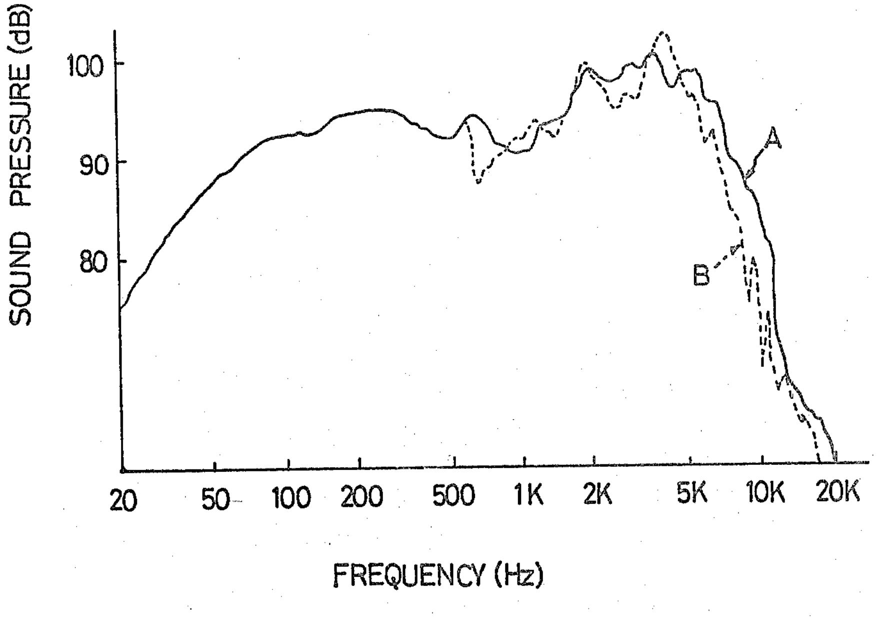
SOUND PRESSURE (dB)
100
90
80
20
50
100
200
500
1K
2K
5K
10K
20K
FREQUENCY (Hz)
A
B

DIAPHRAGM FOR LOUDSPEAKERS

BACKGROUND OF THE INVENTION

1. Field of the Invention

This invention relates to acoustic diaphragms for loudspeakers and more particularly, to materials useful for making the diaphragms of the just-mentioned type.

2. Description of the Prior Art

Hitherto, diaphrams for loudspeakers have been made of a wide variety of materials. In U.S. Pat. No. 4,190,746, a number of plastics materials are enumerated including, for example, polystyrene, polyvinyl chloride, polymethacrylamide, cellulose acetate, acrylic resins, polyacrylonitrile resin, polyacrylamide, phenolic resins, unsaturated polyester resins, polyoxy resins, polyurethane resins, olefins resins and the like. In this patent, it is disclosed that polypropylene homopolymer or copolymers with minor proportions of olefinically unsaturated copolymerizable monomers such as ethylene can provide a diaphragm for a loudspeaker which can be used satisfactorily over a wide frequency range.

An acoustic diaphragm which is formed of polypropylene is also disclosed in Japanese Patent Publication No. 55-46112. In Japanese Kokai Publication No. 53-45226, there is disclosed a diaphragm formed of 4-methylpentene-1 resin.

However, these known synthetic plastic resin diaphragms have the drawbacks that though their internal loss is great, the propagation velocity and mechanical strengths are so low or small that loudspeakers using these acoustic diaphragms do not exhibit smooth acoustic or frequency chacteristics.

SUMMARY OF THE INVENTION

It is accordingly an object of the present invention to provide a synthetic resin composition for use in the acoustic diaphragm by which an ideal acoustic diaphragm is obtained having a large internal loss and a high propagation velocity.

It is another object of the invention to provide a diaphragm for loudspeakers which is more excellent in acoustic pressure frequency characteristic than known diaphragms when applied for the construction of a loudspeaker.

It is a further object of the invention to provide a diaphragm which is formed of a polyolefin resin and a inorganic short fiber filler of the specific type.

According to the present invention, there is provided a diaphragm for a loudspeaker which is made of a resin composition essentially consisting of 70 to 95 wt% of a polyolefin resin selected from the group consisting of propylene homopolymer or copolymer with a minor amount of an ethylenically unsaturated copolymerizable monomer and a 4-methylpentene-1 polymer and correspondingly 30 to 5 wt% of short fibers of potassium titanate having an average fiber length of 10 to 30 microns, the diaphragm having a density over 0.93 gr./cm$^3$, inclusive.

BRIEF DESCRIPTION OF THE DRAWING

The sole FIGURE is a graph showing a sound pressure-frequency characteristic for loudspeakers using an acoustic diaphragm of the present invention and a pottasium titanate-free polypropylene diaphragm, respectively.

DETAILED DESCRIPTION OF THE INVENTION

Useful polyolefin materials suitable for use in the manufacture of diaphragms are propylene homopolymer or copolymers with ethylenically unsaturated copolymerizable monomers of which a preferable monomer is ethylene monomer, and 4-methylpentene-1 polymer. When the copolymer is used, the copolymerizable monomer may be contained in an amount up to 25 wt% of the copolymer. A typical and preferable copolymerizable monomer is ethylene.

These polyolefin materials should preferably have a molecular weight of about 400,000 to 600,000 in order to impart satisfactory mechanical strengths and acoustic characteristics to the resulting diaphragm.

The inorganic fibers to be admixed with the polyolefin materials are those of potassium titanate, which is typically available under the name of Tismo from Otsuka Chemical Co., Ltd. Potassium titanate fibers useful for these purposes are white, needle-shaped, single crystals and should have an average fiber length of 10 to 30 microns. These fibers have an average diameter of the fibers in the range of 0.1 to 0.5 micron. Potassium titanate in the fibers has the chemical composition of $K_2O.6TiO_2$. As a matter of course, the hydrate of pottasium titanate is similarly used in the form of fibers. These fibers have generally a density up to 3.3 and a bulk density of below 0.2.

The polyolefin material and the potassium titanate fibers are mixed in a ratio of 70–95:30–5 on the weight basis. In practical applications, the mixture are thermally molten and well admixed, followed by shaping as usual to obtain a sheet having a thickness of 0.1 to 0.8 mm. This sheet is then subjected to the vacuum forming or the pressure forming in a mold of a desired form to give an acoustic diaphragm of the desired form. The term "diaphragm" used herein means all the types of diaphragms including cone and dome forms. The diaphragm formed of the above-described composition should have a density over 0.93 gr./cm$^3$, inclusive.

The diaphragm of the invention has a high propagation velocity while keeping the internal loss at a relatively high level as will be particularly illustrated in examples appearing hereinafter.

The reason why use of potassium titanate fibers is effective in improving the acoustic characteristics is believed due to the fact that the potassium titanate fibers are much finer and shorter than other known fibers such as carbon fibers, glass fibers and the like. This permits uniform dispersion of the titanate fibers in plastic resin and strong bonding of the fibers by the resin.

The present invention is particularly described by way of examples.

EXAMPLE 1

Polypropylene having an ethylene content of about 20% was used as a polyolefin plastic resin and was admixed with 5 to 30 wt% of potassium titanate fibers, followed by thermally melting and sufficiently mixing at a temperature of 240° C. The mixture was formed into a sheet having a thickness of 0.4 mm. This sheet was then subjected to the vacuum forming or pressure forming in a mold to obtain an acoustic diaphragm.

EXAMPLE 2

4-methylpentene-1 polymer was used as a polyolefin resin and was admixed with 5 to 30 wt% of potassium titanane fibers. Thereafter, the general procedure of Example 1 was repeated except that the hot press forming was effected.

The physical properties of the acoustic diaphragms obtained in Example 1 are shown in Table 1 below.

TABLE 1

| | Amount of Potassium Titanate Fibers (%) | | | | |
|---|---|---|---|---|---|
| | 0 | 5 | 10 | 20 | 30 |
| Propagation Velocity kg/sec. | 1.2 | 1.3 | 1.5 | 2.0 | 2.2 |
| Internal Loss tan δ | 0.08 | 0.08 | 0.075 | 0.07 | 0.05 |
| Density gr./cm$^3$ | 0.90 | 0.95 | 1.0 | 1.1 | 1.2 |

As will be apparently seen in Table 1, the propagation velocity increases by about 2 times with the internal loss being small. This tendency is true of the acoustic diaphragms obtained in Example 2.

The thermal stability of each of the acoustic diaphragms formed of the polyolefin alone and the mixture having a fibers content of 20% is shown in Table 2.

TABLE 2

| | Amount of Potassium Titanate Fibers | |
|---|---|---|
| | 0% | 20% |
| Thermal Stability | 105–115° C. | 125–135° C. |

As will be seen from Table 2, the thermal stability is improved by about 20° C.

Moreover, the diaphragm which was made of the resin composition of Example 1 having a fibers content of 10% and the known diaphragm formed of the polymer resin alone of Example 1 were used to make dynamic loudspeakers having a diameter of 16 cm. These speakers were subjected to the measurement of sound pressure-frequency characteristic and the results are shown in the sole FIGURE in which A indicates the speaker using the diaphragm of the invention and B indicates the speaker having the known diaphragm. The figure reveals that the characteristic of A is more uniform than the characteristic of B.

What is claimed is:

1. A loudspeaker diaphragm which is made of a resin composition essentially consisting of 70 to 95 wt% of a polyolefin resin selected from the group consisting of (a) polypropylene homopolymer, (b), a copolymer of polypropylene with a minor amount of an ethylenically unsaturated copolymerizable monomer, and (c) 4-methylpentene-1 polymer, said polyolefin resin having been mixed with 30 to 5 wt% of short fibers of potassium titanate, said fibers having an average fiber length of 10 to 30 microns and an average diameter of the fibers of 0.1 to 0.5 micron, the diaphragm having a density over 0.93 gr./cm$^3$, inclusive.

2. A diaphragm according to claim 1, wherein said polyolefin is polypropylene homopolymer.

3. A diaphragm according to claim 1, wherein said polyolefin is polypropylene copolymer with an ethylenically unsaturated copolymerizable monomer.

4. A diaphragm according to claim 1, wherein said short fibers are in the form of needle-shaped, single crystals.

* * * * *